(12) United States Patent
Haruna et al.

(10) Patent No.: US 12,454,102 B2
(45) Date of Patent: Oct. 28, 2025

(54) JOINT STRUCTURE AND JOINING METHOD

(71) Applicant: KAWASAKI JUKOGYO KABUSHIKI KAISHA, Kobe (JP)

(72) Inventors: Shunsuke Haruna, Kobe (JP); Shintaro Fukada, Kobe (JP); Ryoji Ohashi, Kobe (JP); Ryoichi Hatano, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 110 days.

(21) Appl. No.: 18/280,348

(22) PCT Filed: Mar. 28, 2022

(86) PCT No.: PCT/JP2022/014911
§ 371 (c)(1),
(2) Date: Sep. 5, 2023

(87) PCT Pub. No.: WO2022/210506
PCT Pub. Date: Oct. 6, 2022

(65) Prior Publication Data
US 2024/0075691 A1 Mar. 7, 2024

(30) Foreign Application Priority Data
Mar. 30, 2021 (JP) .................. 2021-057682

(51) Int. Cl.
*B32B 41/00* (2006.01)
*B23K 20/12* (2006.01)
(Continued)

(52) U.S. Cl.
CPC ............ *B29C 65/06* (2013.01); *B23K 20/122* (2013.01); *B29C 65/60* (2013.01); *B23K 2103/16* (2018.08)

(58) Field of Classification Search
CPC ......... B29C 65/06; B29C 65/60; B29C 66/71; B29C 65/0681; B29C 65/44;
(Continued)

(56) References Cited

U.S. PATENT DOCUMENTS

| | | |
|---|---|---|
| 2015/0209857 A1* | 7/2015 | Blacket ................. F16D 27/112 228/2.1 |
| 2018/0094660 A1* | 4/2018 | Mayer ................... F16B 19/086 |
| 2019/0143442 A1* | 5/2019 | Ohashi ................... B23K 11/16 428/172 |

FOREIGN PATENT DOCUMENTS

JP 2014-226698 A 12/2014

* cited by examiner

*Primary Examiner* — Michael N Orlando
*Assistant Examiner* — Joshel Rivera
(74) *Attorney, Agent, or Firm* — Oliff PLC

(57) ABSTRACT

A joined assembly includes: a first member; a second member which has a facing part facing the first member in a thickness direction thereof; and joints lying along the facing part to join the first member and the second member to each other. The joints include: a pair of end joints respectively located at the opposite end portions of the facing part; and an intermediate joint located between the end joints and having a lower joining strength than the end joints. The end joint includes a fastening member mechanically joining the first member and the second member. The intermediate joint includes a friction-stirred part joining the first member and the second member by friction stir.

8 Claims, 14 Drawing Sheets

(51) Int. Cl.
 *B29C 65/06* (2006.01)
 *B29C 65/60* (2006.01)
 *B23K 103/16* (2006.01)
(58) Field of Classification Search
 CPC ..... B29C 65/562; B29C 65/72; B29C 66/112; B29C 66/1122; B29C 66/131; B29C 66/21; B29C 66/474; B29C 66/524; B29C 66/7212; B29C 66/72141; B29C 66/72143; B29C 66/73921; B29C 66/8322; B23K 20/122; B23K 2103/16; B23K 20/1255; B23K 2101/006; B23K 2101/18; B23K 20/127; B29L 2031/3055; B29L 2031/3064; B29L 2031/3076; B21J 15/025
 USPC .................... 156/60, 64, 350, 351, 378, 379
 See application file for complete search history.

P14

P15

JOINT STRUCTURE AND JOINING METHOD

TECHNICAL FIELD

The present disclosure relates to a joined assembly including a first member and a second member joined to each other via joints, and a method for obtaining the joined assembly.

BACKGROUND ART

Manufacturing a structure, such as an aircraft, a railway vehicle, or an automobile, may require an operation of joining two or more members made of metal, resin, or other material in an overlapping or stacking manner. As one of ways for the joining, a joining way adopting a rivet or fastening member is known.

For instance, Patent Literature 1 as described below discloses a method for joining two plate members consisting of an upper plate member and a lower plate member by riveting and welding in combination. Specifically, in Patent Literature 1, after a rivet is placed in the upper plate member to pass therethrough, a laser beam for welding is irradiated onto a head of the rivet from above to form molten metal passing through the rivet. Consequently, the upper plate member and the lower plate member are joined to each other via the molten metal and the rivet.

In Patent Literature 1, the combination of the riveting and the welding is applied to joints for a roof panel of a vehicle body. The application is expected to satisfactorily ensure a joining strength of the roof panel. However, all the joints require the riveting and the welding. This may cause concerns for demerits, such as an increase in a manufacturing cost and an increase in workloads.

CITATION LIST

Patent Literature

Patent Literature 1: Japanese Unexamined Patent Publication No. 2014-226698

SUMMARY OF INVENTION

The present disclosure has been achieved in view of the aforementioned circumstances, and has an object of providing a joined assembly which has a sufficient joining strength and is manufacturable at a relatively affordable cost.

To overcome the aforementioned drawbacks, a joined assembly according to one aspect of the present disclosure includes: a first member, a second member which has a facing part facing the first member in a thickness direction thereof; and joints lying along the facing part to join the first member and the second member. The joints include: a pair of end joints respectively located at the opposite end portions of the facing part; and an intermediate joint located between the end joints and having a lower joining strength than the end joints. The end joint includes a fastening member mechanically joining the first member and the second member. The intermediate joint includes a friction-stirred part joining the first member and the second member by friction stir.

A joining method according to another aspect of the disclosure is a method for joining a first member and a second member which has a facing part facing the first member in a thickness direction thereof. The method includes: an end joining step of forming a pair of end joints respectively at the opposite end portions of the facing part; and an intermediate joining step of forming, between the end joints, an intermediate part having a lower joining strength than the end joints. In the end joining step, the end joint is formed to include a fastening member mechanically joining the first member and the second member, and a friction-stirred part joining the first member and the second member by friction stir. In the intermediate joining step, the intermediate joint is formed to include a friction-stirred part joining the first member and the second member by friction stir and excluding a fastening member. The end joining step and the intermediate joining step are executed by a certain friction stir joining device.

DESCRIPTION OF EMBODIMENTS

Joined Assembly

Figure 1:
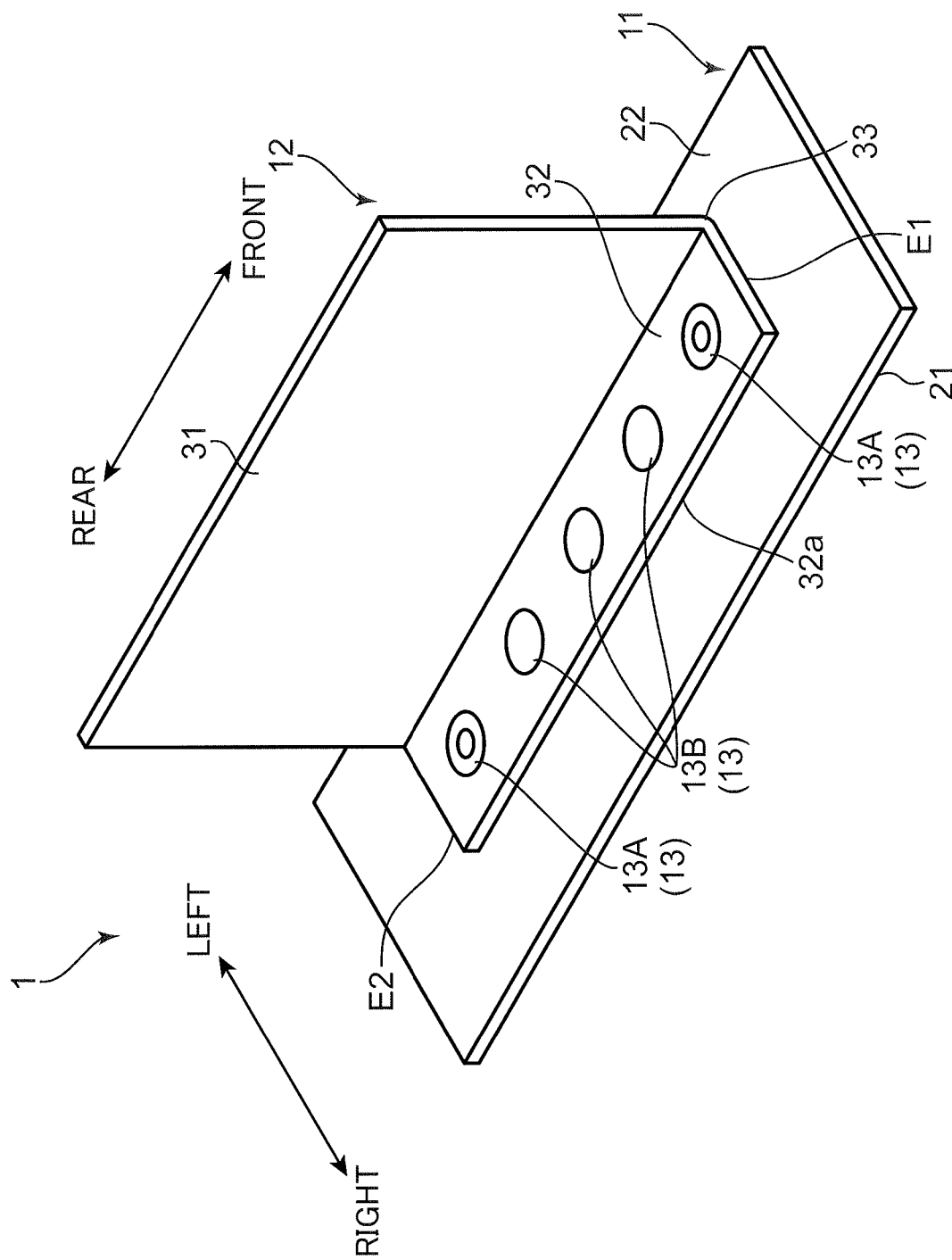
FIG. 1 is a perspective view of a joined assembly according to an embodiment of the present disclosure.

FIG. 1 is a perspective view of a joined assembly 1 according to an embodiment of the present disclosure. As illustrated in the drawing, the joined assembly 1 includes a first member 11, a second member 12, and joints 13 each joining the first member 11 and the second member 12 to each other. The joined assembly 1 is applicable to a structure, e.g., an aircraft, a railway vehicle, or an automobile.

The first member 11 is a member having a planar shape to form an outer panel of the structure, and having a given thickness. The first member 11 has a surface 21 to be an outer surface of the outer panel, and a back surface 22 opposite to the surface 21.

The second member 12 is a frame member having a main body 31 and a flange 32, and having a cross-sectionally L-shape. Hereinafter, a direction in which a ridge line where the main body 31 and the flange 32 meet extends is defined as a front-rear direction and a direction perpendicularly intersecting the front-rear direction is defined as a left-right direction. The main body 31 has a planar shape and stands on the back surface 22 of the first member 11 in a direction perpendicular to the back surface 22, and extends in the front-rear direction along the back surface 22. The flange 32 extends either leftward or rightward from an end of the main body 31 that is closer to the first member 11, and the flange is in contact with the back surface 22 of the first member 11. In the embodiment, the flange 32 extends rightward and is in contact with the back surface 22 of the first member 11. In other words, the flange 32 faces the first member 11 in a thickness direction thereof to overlap the first member 11 in a layered manner. A thickness of the second member 12, i.e., a thickness of each of the main body 31 and the flange 32, may be the same as or different from the thickness of the first member 11. The flange 32 corresponds to a "facing part" in the disclosure.

The main body 31 and the flange 32 define a boundary therebetween as a bent section 33 which is bent at an angle of substantially 90°. In other words, the second member 12 including the one bent section 33 can be the cross-sectionally L-shaped frame member.

The flange 32 has a rectangular shape having long sides each extending in the front-rear direction and short sides each extending in the left-right direction. In other words, the flange 32 is a member having ends of a front end E1 and a rear end E2, and having a strip shape. A surface of the flange 32 that is closer to the first member 11 serves as a contact surface 32a being in contact with the back surface 22 of the first member 11.

Each of the first member 11 and the second member 12 is made of thermoplastic composite. Specifically, each of the first member 11 and the second member 12 is formed of a fiber reinforced thermoplastic resin including a base material made of thermoplastic resin and reinforcing fibers impregnating the base material.

Examples of the thermoplastic resin adoptable for the base material of each of the first member 11 and the second member 12 include polypropylene (PP), polyethylene (PE), polyamide (PA), polystyrene (PS), polyaryletherketone (PEAK), polyacetal (POM), polycarbonate (PC), polyethylene terephthalate (PET), polyetheretherketone (PEEK), polyphenylene sulfide (PPS), ABS resin, and thermoplastic epoxy resin. Available examples of the reinforcing fibers impregnating the base material include carbon fibers, glass fibers, ceramic fibers, metal fibers, and organic fibers.

The joints 13 align in the front-rear direction along the flange 32. Specifically, the joints 13 include a pair of front and rear end joints 13A, and a plurality of, specifically, three intermediate joints 13B located between the two end joints 13A. Each end joint 13A joins a front end portion or a rear end portion of the flange 32 to the first member 11, the front end portion or the rear end portion being a portion in the vicinity of the front end E1 or the rear end E2 of the flange 32. Each intermediate joint 13B joins an intermediate portion of the flange 32 in the front-rear direction to the first member 11, the intermediate portion being a portion of the flange 32 except for the front end portion and the rear end portion. As described hereafter, the end joint 13A and the intermediate joint 13B have joining configurations different from each other in such a manner that the end joint 13A has a higher joining strength than the intermediate joint 13B.

Configuration of Each Joint

Figure 2:
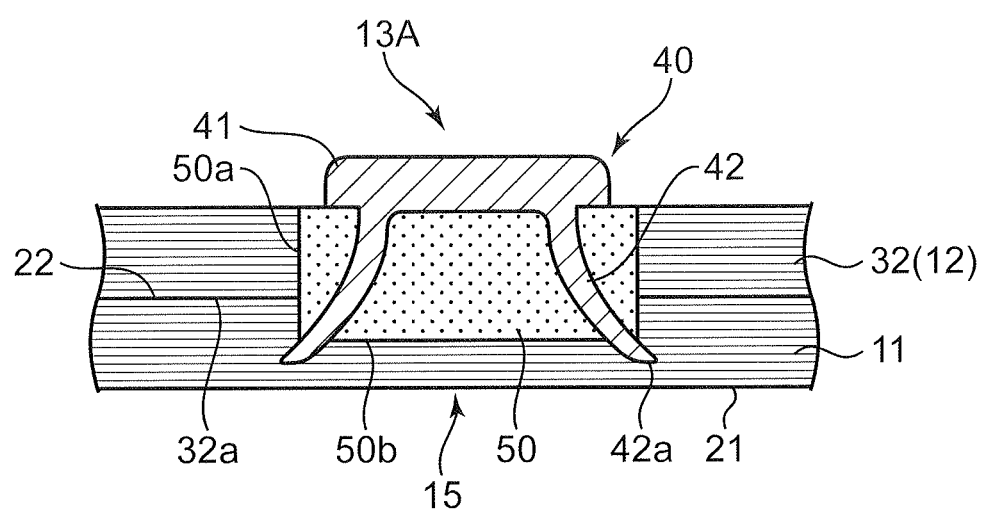
FIG. 2 is a cross-sectional view of a configuration of an end joint.

FIG. 2 is a cross-sectional view of a configuration of the end joint 13A. As illustrated in the drawing, the end joint 13A joins an overlapping part 15 where the first member 11 and the front end portion or the rear end portion of the flange 32 of the second member 12 overlap each other, and the end joint includes a rivet 40 and a friction-stirred part 50. In other words, the end joint 13A relatively firmly joins the overlapping part 15 by a combination of the rivet 40 and the friction-stirred part 50. In the description below, a direction from the first member 11 to the second member 12 is referred to as "upward or up", and the opposite direction is referred to as "downward or down". This is for convenience of description and is not intended to limit a posture of the joined assembly 1.

The friction-stirred part 50 is a weld formed of a material friction stirred and hardened at the overlapping part 15. The friction-stirred part 50 has a columnar shape so as to correspond to a region where a rotary tool 101 to be described later has been plunged. The friction-stirred part 50 does not always necessarily reach the first member 11 on a lower side. In the embodiment, however, a depth of the friction-stirred part 50 is set to a value which is larger than a thickness of the second member 12 or the flange 32 so that the friction-stirred part reaches the first member 11. The friction-stirred part 50 has a peripheral surface 50a having a cylindrical shape at a position on a boundary between the friction-stirred part 50 and a non-friction-stirred area (base member area) surrounding the friction-stirred part. The friction-stirred part 50 further has a bottom surface 50b having a circular shape at a position on a boundary between the friction-stirred part 50 and a non-friction-stirred area (base member area) below the friction-stirred part.

The rivet 40 is a fastening member placed in the overlapping part 15 to mechanically join the first member 11 and the second member 12. In the embodiment, a self piercing rivet is adopted as the rivet 40 to be placed in a material member having no prepared hole without penetration. The rivet 40 is only required to have a property of enough strength to be placed in the overlapping part 15, and thus, any suitable material is selectable therefor. For instance, a metal member made of titanium or high tensile strength steel, or a resin member made of thermoplastic resin or thermoplastic composite is adoptable as the rivet 40 having such property. In use of the rivet 40 made of titanium for joining of the fiber reinforced resin member like the embodiment, a rivet made of titanium alloy, e.g., Ti-6AL-4V, is preferable.

The rivet 40 is placed in the overlapping part 15 after the rotary tool 101 to be described later is plunged into the overlapping part 15, i.e., after the overlapping part is friction stirred. The rivet 40 having been placed includes: a head 41 having a circular plate shape and being in contact with an upper surface of the flange 32 of the second member 12 under a pressure; and a hollow shaft 42 extending downward from a lower surface of the head 41 while gradually and radially expanding. The shaft 42 passes through the second member 12 or the flange 32, and extends to a certain midway position in the thickness direction of the first member 11. The shaft 42 radially expands as advancing away from the head 41, and accordingly has a distal end 42a protruding to an outside of the friction-stirred part 50. The distal end 42a serves as an interlocking section to fix the first member 11 and the second member 12 or the flange 32 to each other in a contact state under a pressure. Specifically, the first member 11 and the second member 12 are fixed to each other in a contact state under a pressure between the interlocking section formed of the distal end 42a protruding to the outside of the friction-stirred part 50 and the head 41 located on an upper surface of the second member 12.

Figure 3:
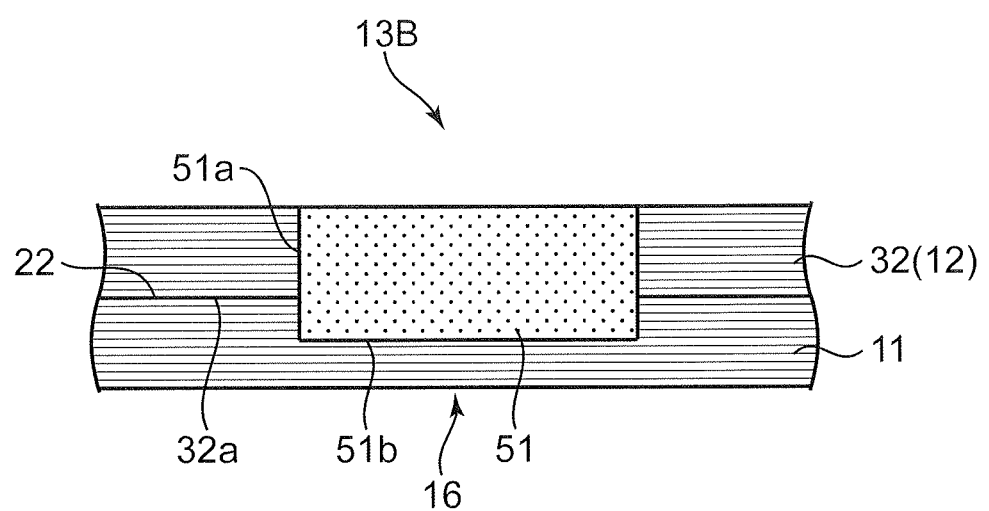
FIG. 3 is a cross-sectional view of a configuration of an intermediate joint.

FIG. 3 is a cross-sectional view of a configuration of the intermediate joint 13B. As illustrated in the drawing, the intermediate joint 13B joins an overlapping part 16 where the first member 11 and the intermediate portion of the flange 32 of the second member 12 in the front-rear direction overlap each other, and the intermediate joint 13B includes a friction-stirred part 51. The intermediate joint 13B differs from the end joint 13A in excluding a rivet 40 (FIG. 2). It is seen from the intermediate joint 13B excluding the rivet 40 that the intermediate joint 13B has a lower joining strength than the end joint 13A.

The friction-stirred part 51 in the intermediate joint 13B is a weld, like the friction-stirred part 50 in the end joint 13A, formed of a material friction stirred and hardened at the overlapping part 16, and the friction-stirred part 51 has a columnar shape having a depth which is larger than the thickness of the second member 12 or the flange 32. The friction-stirred part 51 has a peripheral surface 51a having a cylindrical shape at a position on a boundary between the friction-stirred part 51 and a non-friction-stirred area (base member area) surrounding the friction stirred part. The friction-stirred part 51 further has a bottom surface 51b having a circular shape at a position on a boundary between the friction-stirred part 51 and a non-friction-stirred area (base member area) below the friction-stirred part.

Friction Stir Joining Device

Figure 4:
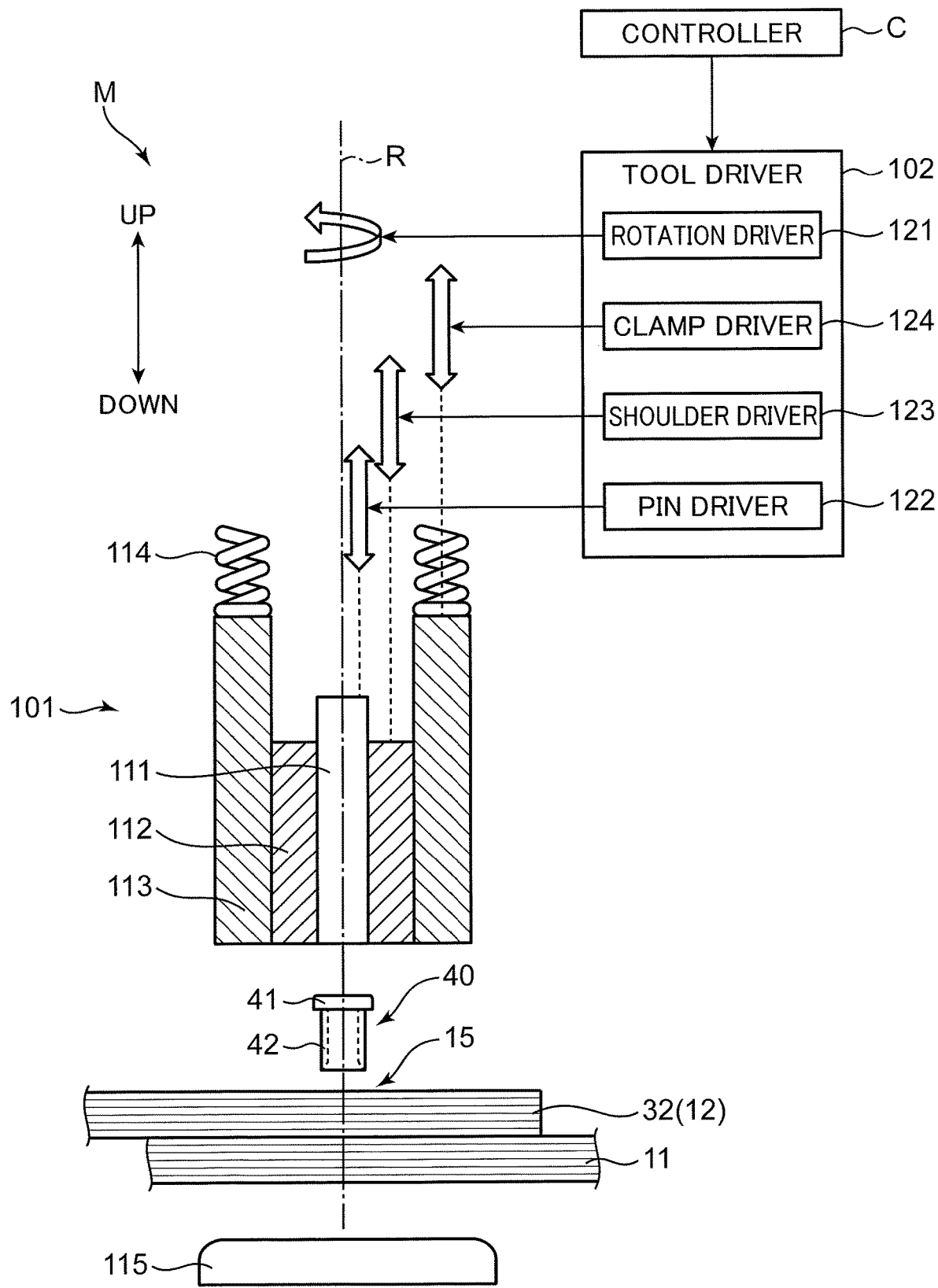
FIG. 4 is a schematic view showing an overall configuration of a friction stir joining device for use in manufacturing the joined assembly.

The joined assembly 1 including each end joint 13A and each intermediate joint 13B described above is manufactured by a friction stir joining device M illustrated in FIG. 4. As illustrated in the drawing, the friction stir joining device M includes: the double-acting rotary tool 101; a tool driver 102 that rotates, and raises and lowers the rotary tool 101; and a controller C that controls an operation of the tool driver 102. Although FIG. 4 indicates directions "up" and "down", the directions are for convenience of description and are not intended to limit a use posture of the rotary tool 101.

The rotary tool 101 is supported by an unillustrated tool fixing part. The tool fixing part can be, for example, a distal end of an articulated robot. A backup member 115 is disposed facing a lower end surface of the rotary tool 101. The first member 11 and the second member 12 to be joined to each other are arranged between the rotary tool 101 and the backup member 115. FIG. 4 illustrates an arrangement example of the members in forming the end joint 13A. Specifically, a joining target exemplified in FIG. 4 indicates the overlapping part 15 where the first member 11 and the flange 32 of the second member 12 overlap in an end portion in the front-rear direction.

The rotary tool 101 includes a pin member 111, a shoulder member 112, a clamp member 113, and a spring 114. The pin member 111 has a columnar shape, and is disposed with its axis extending in the up-down direction. The pin member 1/1 is rotatable about the axis as a rotation axis R, and can advance and retract (shift downward and upward) in the up-down direction along the rotation axis R.

The shoulder member 112 is located to surround an outer periphery of the pin member 111. Specifically, the shoulder member 112 includes a hollow part into which the pin member 111 is inserted, and has a cylindrical shape. The shoulder member 112 has an axis that is coaxial with the axis (the rotation axis R) of the pin member 111. The shoulder member 112 is rotatable about the rotation axis R of the pin member 111, and can advance and retract (shift downward and upward) in the up-down direction along the rotation axis R. In this manner, the shoulder member 112 and the pin member 111 inserted into the hollow part of the shoulder member can shift relative to each other along the rotation axis R while rotating about the rotation axis R. That is to say, the pin member 111 and the shoulder member 112 are not only simultaneously shiftable upward and downward along the rotation axis R, but also independently shiftable such that one shifts downward and the other shifts upward.

The clamp member 113 is located to surround an outer periphery of the shoulder member 112. Specifically, the clamp member 113 includes a hollow part into which the shoulder member 112 is inserted, and has a cylindrical shape. The clamp member 113 has an axis that is also coaxial with the rotation axis R. The clamp member 113 does not rotate about the axis, but can advance and retract (shift downward and upward) in the up-down direction along the rotation axis R. The clamp member 113 serves to surround the outer periphery of the pin member 111 or the shoulder member 112 when the pin member or the shoulder member performs friction stir. The clamp member 113 surrounding the outer periphery enables a friction-stirred part to be finished smoothly without scattering friction stir materials.

The spring 114 is attached to an upper end of the clamp member 113 to press the clamp member 113 downward in a direction toward the joining target. The clamp member 113 is attached to the tool fixing part via the spring 114 interposed therebetween.

The backup member 115 has an upper surface that serves as a support surface to come into contact with a lower surface of the joining target. Specifically, the backup member 115 is a backing member that supports the joining target when the pin member 111 or the shoulder member 112 is plunged into the joining target. The clamp member 113 pressed by the spring 114 presses the joining target against the backup member 115.

The tool driver 102 includes a rotation driver 121, a pin driver 122, a shoulder driver 123, and a clamp driver 124. The rotation driver 121 includes a motor, a driving gear, and the like, and drives the pin member 111 and the shoulder member 112 rotatably about the rotation axis R. The pin driver 122 is a mechanism that causes the pin member 111 to advance and retract (shift downward and upward) along the rotation axis R. The pin driver 122 drives the pin member III so that the pin member 111 is plunged into the joining target and retracted from the joining target. The shoulder driver 123 is a mechanism that causes the shoulder member 112 to advance and retract along the rotation axis R, and to be plunged into and retract from the joining target of the shoulder member 112. The clamp driver 124 is a mechanism that causes the clamp member 113 to advance and retract along the rotation axis R. The clamp driver 124 causes the clamp member 113 to move toward the joining target and press the joining target against the backup member 115. At this time, a pressing force of the spring 114 acts.

The controller C includes a microcomputer, and controls an operation of each part of the tool driver 102 by executing a predetermined control program. Specifically, the controller C controls the rotation driver 121 to cause the pin member 111 and the shoulder member 112 to perform a required rotation operation. The controller C also controls the pin driver 122, the shoulder driver 123, and the clamp driver 124 to cause the pin member 111, the shoulder member 112, and the clamp member 113 respectively to perform a required advancing and retracting operation.

The friction stir joining device M having the above-described configuration is generally used to weld two or more members by friction stir welding. The friction stir welding performed by using the friction stir joining device M is mainly classified into a welding way adopting a shoulder-preceding process and a welding way adopting a pin-preceding process.

The welding way adopting the shoulder-preceding process includes precedingly plunging the shoulder member 112 of the rotary tool 101 into an overlapping part of the two or more members to perform friction stir there, and, at the same time, retracting the pin member 111 from the overlapping part. Then, the pin member 111 is lowered while the shoulder member 112 is retracted or raised to smooth an upper surface of the overlapping part. By contrast, the welding way adopting the pin-preceding process includes precedingly plunging the pin member 11 of the rotary tool 101 into the overlapping part to perform friction stir there, and, at the same time, retracting the shoulder member 112 from the overlapping part. Then, the shoulder member 112 is lowered while the pin member 111 is retracted or raised to smooth the upper surface of the overlapping part.

Manufacturing of a Joined Assembly

Here, friction stir welding combined with riveting is used to manufacture the joined assembly 1 in the embodiment. The friction stir welding combined with riveting means joining with a combination of placing of the rivet 40 (FIG. 2), and friction stir welding, in place of only the general friction stir welding as described above, i.e., in place of the joining way adopting the shoulder-preceding process or the pin-preceding process. The friction stir welding combined with riveting differs from the general friction stir welding in additionally including a rivet as a joining way. In the embodiment, however, the shoulder-preceding process is modified to realize the friction stir welding combined with riveting by using the same friction stir joining device M illustrated in FIG. 4. Specifically, the joined assembly 1 in the embodiment is manufactured by a combination of the general friction stir welding and the friction stir welding combined with riveting by using the same friction stir joining device M. For instance, the joined assembly 1 can be manufactured by the following schematic procedure.

First, the first member 11 and the second member 12 are arranged in a state where the contact surface 32a of the flange 32 of the second member 12 is in contact with the back surface 22 of the first member 11.

Next, the first member 11 and portions of the flange 32 are joined to each other by using the same friction stir joining device M to form joints 13 along the flange 32. In the joining, the friction stir welding combined with riveting and the general friction stir welding are adopted independently depending on each joining portion of the flange 32. Specifically, the front end portion and the rear end portion of the flange 32 are joined to the first member 11 by the friction stir welding combined with riveting to form a pair of front and rear end joints 13A. Further, the intermediate portion of the flange 32 is joined to the first member 11 at locations in the intermediate portion by the general friction stir welding to form a plurality of, specifically, three intermediate joints 13B. This results in manufacturing the joined assembly 1 in which the joints 13 including the pair of end joints 13A and the intermediate joints 13B join the first member 11 and the flange 32 of the second member 12 to each other. Here, forming of the end joint 13A by the aforementioned friction stir welding combined with riveting corresponds to an end joining step, and forming of the intermediate joint 13B by the general friction stir welding corresponds to an intermediate joining step in the disclosure.

A sequence of forming the joints 13 is appropriately settable. For instance, the intermediate joints 13B may be formed after the pair of end joints 13A is formed, or the pair of end joints 13A may be formed after the intermediate joints 13B are formed.

Way of Forming Each End Joint

Next, a way of forming the end joint 13A by using the friction stir joining device M is described in detail. The end joint 13A is formed by the above-described friction stir welding combined with riveting. Specifically, the end joint 13A is formed by plunging the shoulder member 112 of the rotary tool 101 into the overlapping part 15 including the first member 11 and the flange 32 of the second member 12 to execute friction stir, and placing the rivet 4 in the overlapping part 15 having been friction-stirred. Specifically, the way of forming the end joint 13A includes the following four steps including steps P11 to P15.

Figure 5:
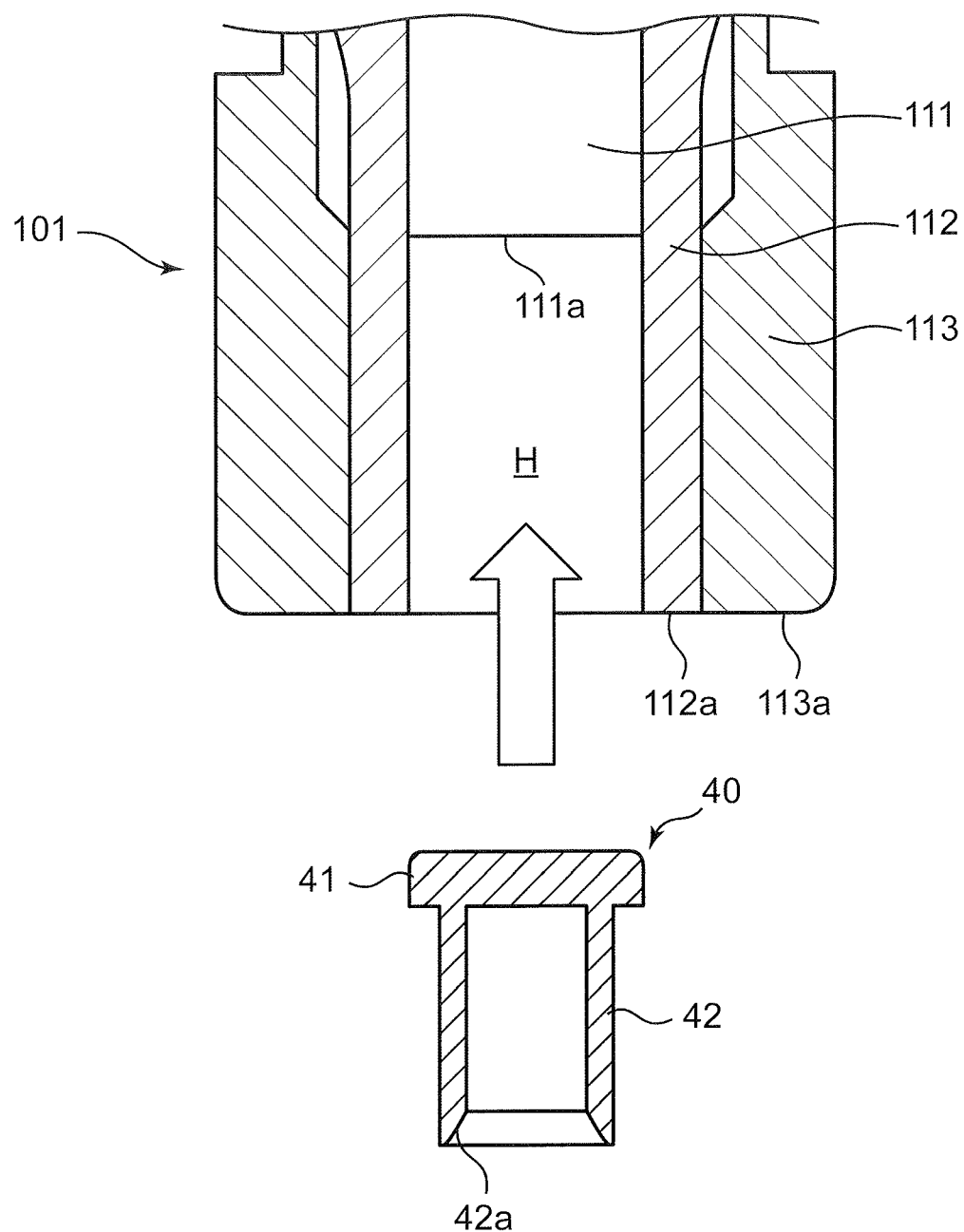
FIG. 5 is an illustration of a first step (preparatory step) for forming the end joint in section.

As shown in FIG. 5, step P11 is a preparatory step of arranging a rivet 40 in the rotary tool 101. In the preparatory step P11, the rivet 40 arranged in the rotary tool 101 is a rivet 40 which is yet to be placed in the overlapping part 15, and thus, the shaft 42 thereof does not radially expand yet. Specifically, the rivet 40 for use in the preparatory step P11 includes a head 41 and a shaft 42 having a cylindrical shape straightly extending from the head 41. The shaft 42 has a distal end 42a forming an opening edge at a lower end of the shaft, and having an inner peripheral surface tapered in such a manner that the distal end 42a has a thickness decreasing as advancing to a tip thereof, that is, in such a manner that the distal end 42a becomes sharper as advancing to the tip.

For the arrangement of the rivet 40 in the rotary tool 101, the controller C (see FIG. 4) drives the pin driver 122 to raise the pin member 111 so that an accommodation space H for the rivet 40 comes into existence inside the shoulder member 112. Specifically, the controller C raises a distal end (lower end) 111a of the pin member 111 by a stroke equal to or higher than an entire height of the rivet 40 with respect to a distal end (lower end) 112a of the shoulder member 112 to define the accommodation space H communicating with an opening at a lower end of the shoulder member 112. Such a rivet 40 having a diameter slightly smaller than an inner diameter of the shoulder member 112 is selected so that the rivet 40 can be accommodated in the accommodation space H.

Figure 6:
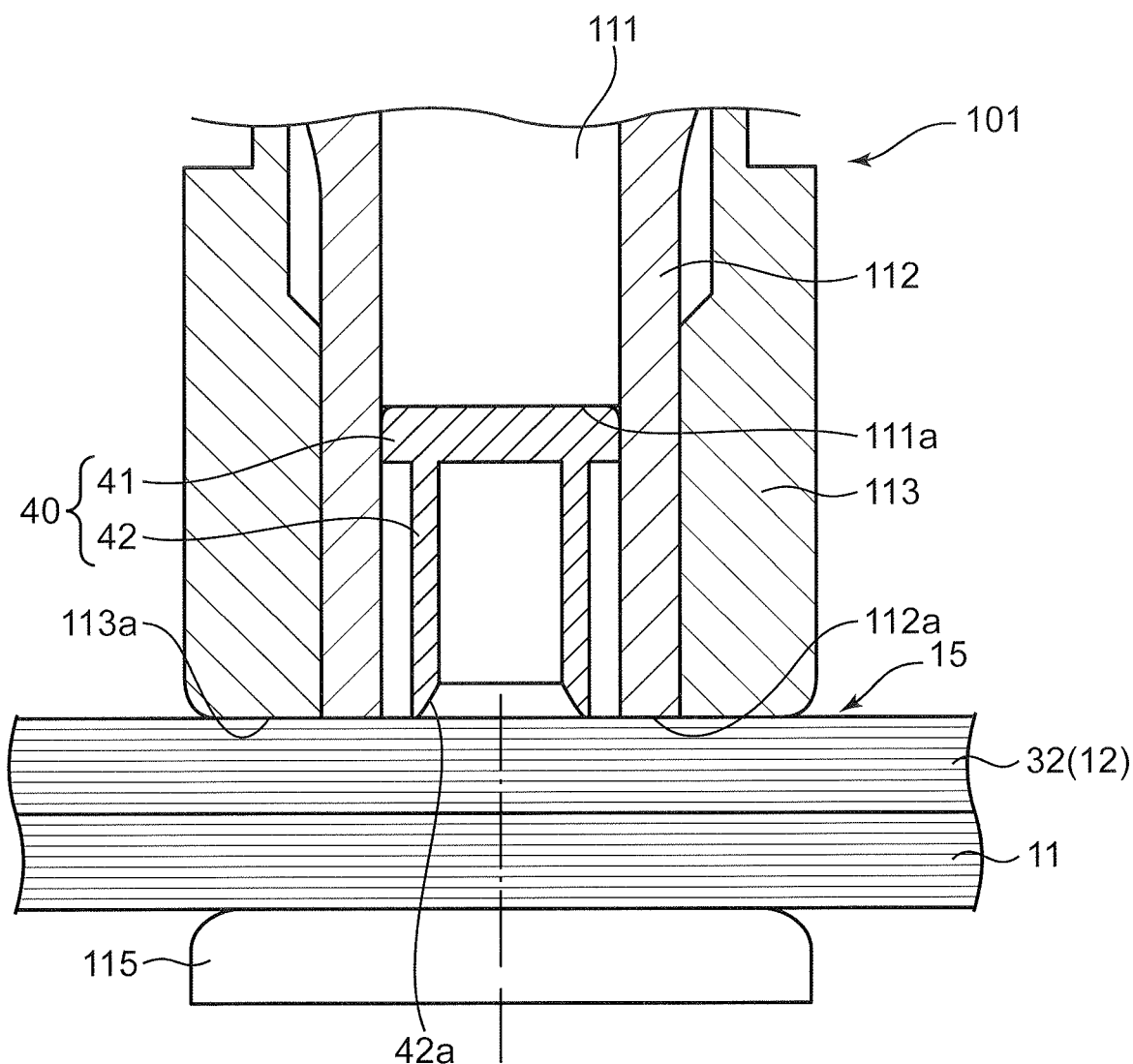
FIG. 6 is an illustration of a second step (positioning step) for forming the end joint in section.

As shown in FIG. 6, step P12 is a positioning step of setting a position of the rotary tool 101 bearing the rivet 40 to the overlapping part 15. In the positioning step P12, the controller C controls the shoulder driver 123 and the clamp driver 124 to bring the distal end 112a of the shoulder member 112 and the distal end 113a of the clamp member 113 into contact with the upper surface of the second member 12 or the flange 32 after setting a position of the rotation axis R (FIG. 4) of the rotary tool 101 to align with the center of the overlapping part 15 supported on the backup member 115. Further, the controller C keeps an axial relative position relation between the pin member 111 and the shoulder member 112 to retract the distal end 111a of the pin member 111 upward with respect to the distal end 112a of the shoulder member 112 by a predetermined amount so as to accommodate the rivet 40 between the distal end 111a of the pin member 111 and the upper surface of the second member 12 or the flange 32.

Figure 7:
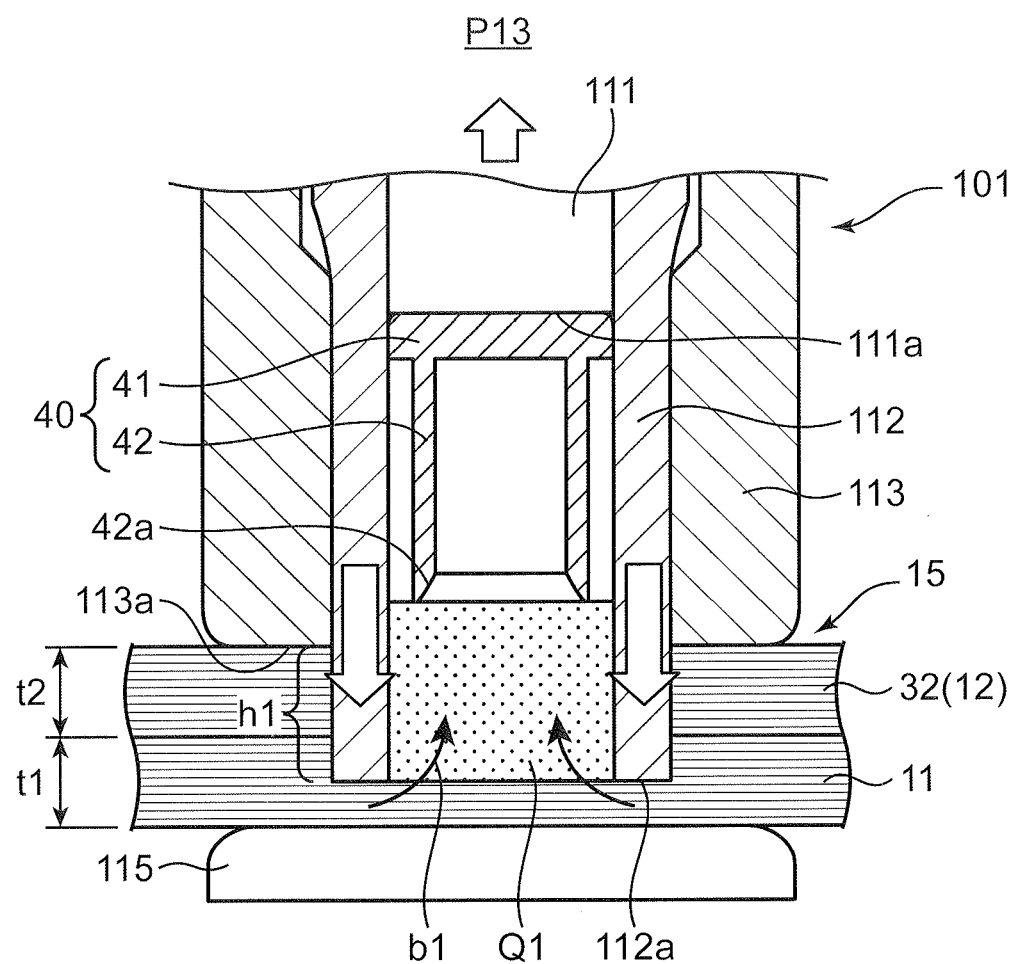
FIG. 7 is an illustration of a third step (plunging step) for forming the end joint in section.

As shown in FIG. 7, step P13 is a plunging step of plunging the shoulder member 112. In the plunging step P13, the controller C controls the rotation driver 121 to rotate the pin member 111 and the shoulder member 112 at a high speed, and controls the shoulder driver 123 to lower the shoulder member 112 and plunge the shoulder member 112 into the overlapping part 15. The controller C controls the pin driver 122 to raise the pin member 111. This operation friction-stirs the overlapping part 15 to soften a material thereof and make a plastic flow of the material, and the softened material Q1 overflows out of a plunging region of the shoulder member 112. The softened material Q1 having overflowed is released into a hollow space in the shoulder member 112 that comes into existence by the rising (retraction) of the pin member 111 as denoted by an arrow b1. At a start of the plunging step P13, the pin member 111 has been retracted upward sufficiently to allow the accommodation space H (FIG. 5) to come into existence. Thus, the above-described retraction operation of the pin member 111 may be omitted.

When a plunging depth of the shoulder member 112 is defined as "h1", the plunging depth h1 is preferably set to a value at which the shoulder member 112 passes through the second member 12 on an upper side, but does not passes through the first member 11 on the lower side. In other words, the plunging depth h1 is preferably set to a value larger than a thickness t2 of the flange 32 of the second member 12 and smaller than a total (t1+t2) of the thickness t2 and a thickness t1 of the first member 11. In this case, the friction-stirred part 50 (FIGS. 8A and 8B) formed in a placing step including steps P14 and P15 to be described later passes through the second member 12 or the flange 32 in the thickness direction thereof, and reaches a certain midway position in the thickness direction of the first member 11, i.e., between the surface 21 and the back surface 22 of the first member 11.

In the embodiment, each of the first member 11 and the second member 12 is made of thermoplastic composite, and hence, the softened material Q1 having undergone the friction stir contains reinforcing fibers. However, the reinforcing fibers contained in the softened material Q1 have been finely cut through the friction stir. This facilitates the placing of the rivet 40 to be described later.

Figure 8A:
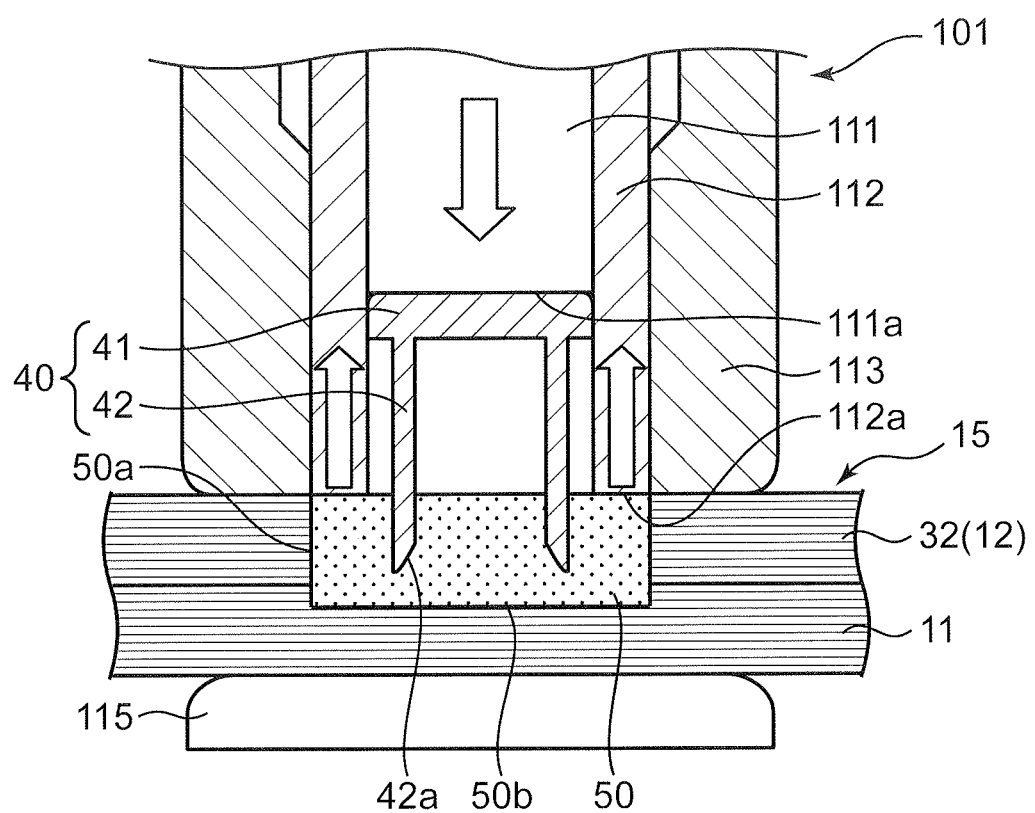
FIG. 8A is an illustration of a start state of a fourth step (placing step) for forming the end joint in section.
Figure 8B:
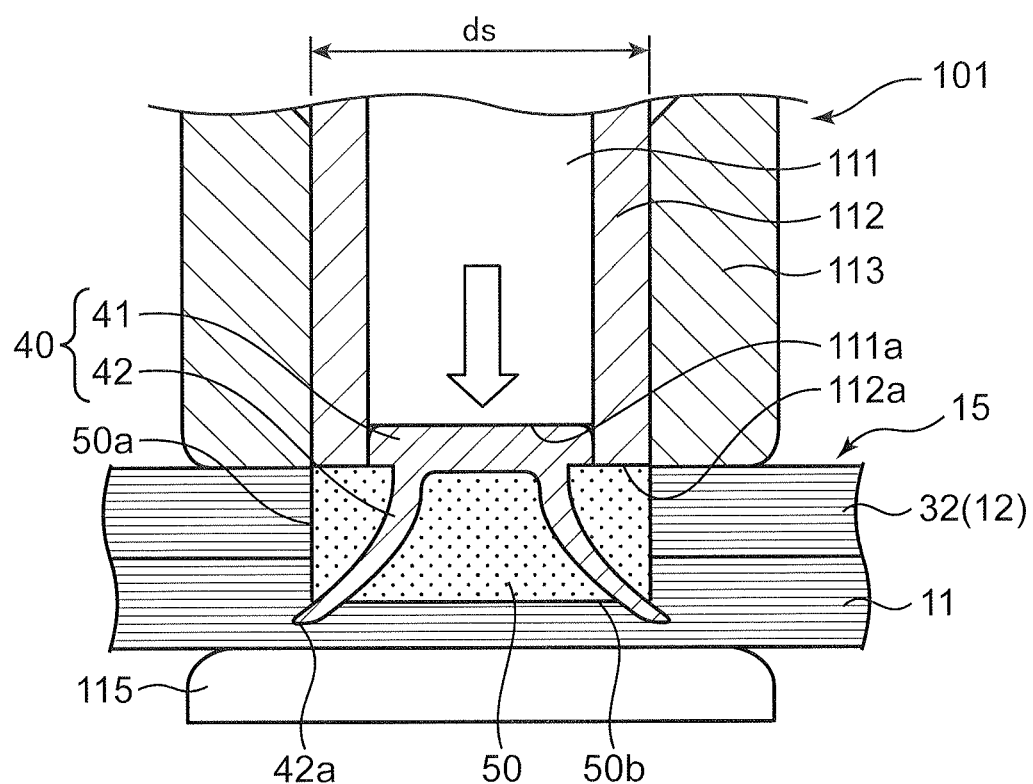
FIG. 8B is an illustration of a finish state of the fourth step (placing step) in section.

As shown in FIGS. 8A and 8B, steps P14 and P15 establish the placing step of placing the rivet 40 in the overlapping part 15. In the placing step including steps P14 and P15, the controller C controls the rotation driver 121 to rotate the pin member 111 and the shoulder member 112 at a high speed, and controls the shoulder driver 123 to raise the shoulder member 112. Subsequent to the raising of the shoulder member 112, the controller C controls the pin driver 122 to lower the pin member 111. This operation results in forming the friction-stirred part 50 having a columnar shape in the overlapping part 15, and placing the rivet 40 in a region including the friction-stirred part 50. Hereinafter, the forming of the friction-stirred part 50 and the placing of the rivet 40 will be described in detail.

First, the forming of the friction-stirred part 50 in the placing step P14, P15 will be described. In the placing step P14, P15, the shoulder member 112 shifts upward and the pin member 111 shifts downward. This causes the softened material Q1 (FIG. 7) having been released into the hollow space to move to a region where the shoulder member 112 has been plunged, and backfilling with the material is performed. The backfilling material forms the friction-stirred part 50 in the overlapping part 15 in cooperation with the material having left the hollow space. The friction-stirred part 50 is made of material having undergone the friction stir in the overlapping part 15, and has a columnar shape with an outer diameter substantially agreeing with an outer diameter ds (FIG. 8B) of the shoulder member 112 and a height substantially agreeing with the plunging depth h1 of the shoulder member 112 (FIG. 7). Specifically, the friction-stirred part 50 has the peripheral surface 50a having a cylindrical shape with the height h1, and the bottom surface 50b having a circular shape with the outer diameter ds. The friction-stirred part 50 contains the softened material. By contrast, a base member area surrounding the friction-stirred part 50 keeps original stiffness of each of the first member 11 and the second member 12, and further keeps a reinforcing configuration by the reinforcing fibers.

Next, placing of the rivet 40 through the placing step P14, P15 will be described. In the placing step P14, P15, the rivet 40 is pressed downward in accordance with lowering of the pin member 111, and the pressed rivet 40 is pushed into the overlapping part 15. In other words, in the placing step P14, P15, the rivet 40 is placed by using the pin member 111 being a component already included in the rotary tool 101. Thus, in the embodiment, the end joint 13A including the rivet 40 and the friction-stirred part 50 can be formed without preparing another tool especially for the placing of the rivet 40.

Specifically, as shown in FIG. 8A, 8B, in the placing step P14, P15, the pin driver 122 lowers the pin member 111 to apply a pressing force to the head 41 of the rivet 40 and then pusses the rivet 40 into the overlapping part 15. The rivet 40 is preliminarily put in the accommodation space H (FIG. 5) in such a manner that a top surface of the head 41 faces the distal end 111a of the pin member 111. Thus, when the pin member 111 shifts downward, the rivet 40 also shifts downward, and the shaft 42 of the rivet advances into the friction-stirred part 50 from the tip thereof. In accordance with the advancement of the rivet 40, i.e., in accordance with a progress of downward pressing of the pin member 111, the distal end 42a of the shaft 42 finally reaches the bottom surface 50b of the friction-stirred part 50. Here, an area located below the bottom surface 50b is an unsoftened base member area. Hence, when the distal end 42a reaches the bottom surface 50b, an axial resistance acting on the shaft 42 increases. This causes a force of radially expanding the distal end 42a to act onto the shaft 42 in the state where at least the distal end 42a reaches the bottom surface 50b. An occurrence of such a radial expansion force is induced by the tapered shape of the inner surface of the distal end 42a. Specifically, as shown in FIG. 8B, the shaft 42 of the rivet 40 deforms into a bell shape that an outer diameter increases as advancing to the tip thereof by the synergistic effect of an increase in the resistance accompanied by the reaching of the distal end 42a to the bottom surface 50b, and the tapered shape of the distal end 42a.

FIG. 8B shows a state where the head 41 of the rivet 40 having reached the upper surface of the flange 32 of the second member 12 that is the upper surface of the overlapping part 15, i.e., a state where the placing of the rivet 40 has been completed. As shown in the drawing, at the completion of the placing of the rivet 40, the distal end 42a of the shaft 42 of the rivet 40 extends beyond the bottom surface 50b of the friction-stirred part 50 so as to be plunged into the base member area located below the bottom surface 50b, and further extends beyond the peripheral surface 50a of the friction-stirred part 50 so as to be plunged into a base member area located on the outside of the peripheral surface 50a. The distal end 42a plunged into the area on the outside of the friction-stirred part 50 exerts an anchor effect of resisting against a force of separating the first member 11 and the second member 12 from each other. That is to say, the distal end 42a serves as an interlocking section to fix the first member 11 and the second member 12 or the flange 32 to each other.

The friction-stirred part 50 is formed in the overlapping part 15 and the rivet 40 is placed therein through steps P11 to P15 described above. The rivet 40 and the friction-stirred part 50 establish the end joint 13A joining the first member 11 and the flange 32 of the second member 12 in the overlapping part 15. Specifically, the end joint 13A including the rivet 40 and the friction-stirred part 50 in the overlapping part 15 joins the flange 32 of the second member 12 to the first member 11 in an end portion of the flange 32 in the front-rear direction.

Way of Forming Each Intermediate Joint

Next, a way of forming the intermediate joint 13B by using the friction stir joining device M will be described in detail. The intermediate joint 13B is formed by the above-described general friction stir welding. The general friction stir welding includes the shoulder-preceding process and the pin-preceding process as described above. Although either of the processes can form the intermediate joint 13B, forming the intermediate joint 13B by the shoulder-preceding process will be described in the embodiment. In this case, the intermediate joint 13B is formed through four steps P21 to P24 shown in FIG. 9.

Step 21 is a positioning step of setting a position of the rotary tool 101 to the overlapping part 16. In the positioning step P21, the controller C (FIG. 4) controls the tool driver 102 to bring the distal ends 111a to 113a respectively of the pin member 111, the shoulder member 112, and the clamp member 113 into contact with the upper surface of the flange 32 of the second member 12 after setting the position of the rotation axis R (FIG. 4) of the rotary tool 101 to align with the center of the overlapping part 16 supported on the backup member 115.

Figure 9:
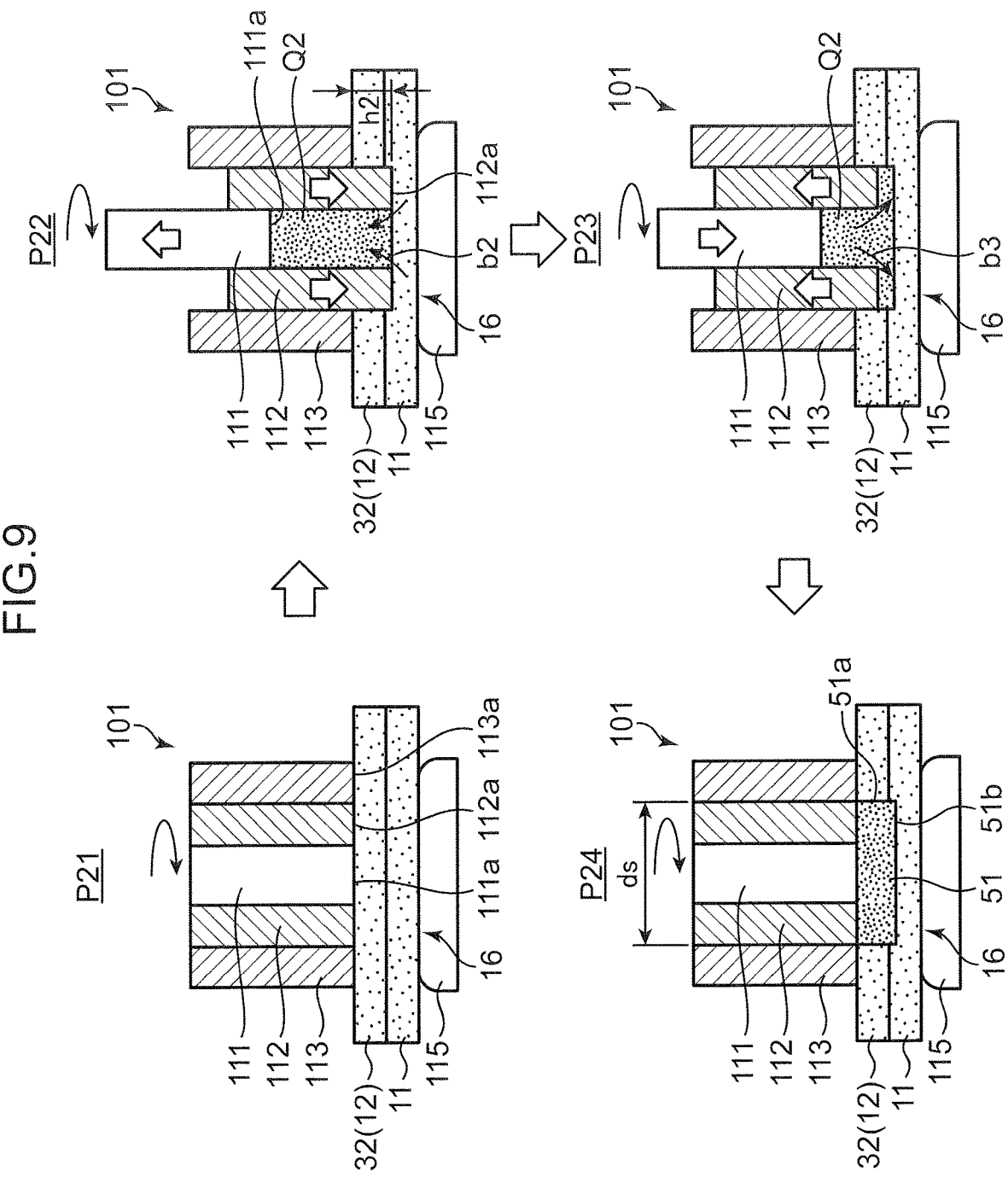
FIG. 9 includes schematic views together respectively showing steps for forming the intermediate joint in section.

Step P22 is a plunging step of plunging the shoulder member 112. In the plunging step P22, the controller C controls the rotation driver 121 to rotate the pin member 111 and the shoulder member 112 at a high speed, and controls the shoulder driver 123 to lower the shoulder member 112 and plunge the shoulder member 112 into the overlapping part 16. The controller C controls the pin driver 122 to raise the pin member 111. This operation friction stirs the overlapping part 16 to soften a material thereof and make a plastic flow of the material, and the softened material Q2 overflows out of a plunging region of the shoulder member 112. The softened material Q2 having overflowed is released into a hollow space in the shoulder member 112 that comes into existence by the rising (retraction) of the pin member 111 as denoted by an arrow b2. A plunging depth h2 of the shoulder member 112 is set to a value at which the shoulder member 112 passes through at least the second member 12 on the upper side. FIG. 9 exemplifies plunging of the shoulder member 112 into the first member 11 on the lower side until a certain midway position in the thickness direction thereof. In this case, the friction-stirred part 51 to be formed in a leveling step P24 to be described later passes through the second member 12 or the flange 32 in the thickness direction thereof, and reaches the certain midway position in the thickness direction of the first member 11.

Step P23 is a backfilling step of performing backfilling with the softened material Q2 having overflowed. In the backfilling step P23, the controller C controls the shoulder driver 123 and the pin driver 122 to raise (retract) the shoulder member 112 and lower the pin member 111 while rotating the pin member 111 and the shoulder member 112 at a high speed. This operation causes the softened material Q2 having released into the hollow space to move to a region where the shoulder member 112 has been plunged, and backfilling with the material is performed in this manner as denoted by an arrow b3. The backfilling material forms the friction-stirred part 51 in the overlapping part 16 in cooperation with the material having left the hollow space as shown in the view of the subsequent step P24. The friction-stirred part 51 is formed of the material having undergone the friction stir in the overlapping part 16, and has a columnar shape with an outer diameter substantially agreeing with the outer diameter ds of the shoulder member 112 and a height substantially agreeing with the plunging depth h2 of the shoulder member 112. Specifically, the friction-stirred part 51 has the peripheral surface 51a having a cylindrical shape with the height h2 and the bottom surface 51b having a circular shape with an outer diameter ds.

Step 24 is a leveling step of leveling the friction-stirred part 51. In the leveling step P24, the controller C drives the rotation driver 121 to rotate the pin member 111 and the shoulder member 112 at a predetermined rotational speed in a state where the distal end 1i1a of the pin member 111 and the distal end 112a of the shoulder member 112 are restored to a height position of the upper surface of the flange 32 of the second member 12. This operation levels an upper surface of the friction-stirred part 51 and smooths the upper surface to an extent of almost no protrusions and recessions.

The friction-stirred part 51 having such a smooth upper surface is formed in the overlapping part 16 through steps P21 to P24. The friction-stirred part 51 establishes the intermediate joint 13B joining the first member 11 and the flange 32 of the second member 12 in the overlapping part 16. Specifically, the intermediate joint 13B including the friction-stirred part 51 in the overlapping part 16 joins the flange 32 of the second member 12 to the first member 11 in the intermediate portion in the front-rear direction. The intermediate joint 13B excludes a rivet 40 as described above, and thus, the joining strength of the intermediate joint 13B is lower than the joining strength of the end joint 13A including the rivet 40.

Operational Effects

As described heretofore, in a joined assembly 1 in the embodiment, a pair of front and rear end joints 13A each including, a rivet 40; and a friction-stirred part 50, and an intermediate joint 13B including a friction-stirred part 51 and excluding a rivet 40 join a first member 11 and a flange 32 of a second member 12 being in contact with the first member to each other. This is advantageous to a success in manufacturing the joined assembly 1 having a sufficient strength at a relatively affordable cost.

A friction-stirred part is a weld resulting from a material softened by friction stir and fused. Thus, the joining strength (withstand load) of the friction-stirred part is likely to be lower than the joining strength of the rivet 40 being a mechanical joining way. By contrast, the end joint 13A in the embodiment includes the rivet 40 in addition to the friction-stirred part 50, and thus, the end joint 13A certainly has a high joining strength. In other words, the embodiment allows the end joint 13A including the friction-stirred part 50 and the rivet 40 to have a joining strength sufficiently higher than the joining strength of the intermediate joint 13B including only the friction-stirred part 51 and excluding a rivet 40. Besides, the end joint 13A having the high joining strength is given to an end portion of the flange 32 where a high stress force is likely to occur against an external force, such as a bending or shearing force, applied thereto. This can effectively suppress eventual breakage of the end joint 13A attributed to the external force, and further satisfactorily ensure the joining strength of the joined assembly 1 as a whole.

By contrast, the intermediate joint 13B located between the two end joints 13A includes the friction-stirred part 51 and excludes a rivet 40, and thus, the intermediate joint 13B can exclude the rivet 40 serving as an auxiliary member. This reduces the required number of rivets 40, resulting in achieving suppression of a manufacturing cost of the joined assembly 1 and workloads required for the manufacturing. This is further advantageous to suppression of an increase in the weight of the joined assembly 1 due to additional rivets 40.

In particular, in the embodiment, the pin member 111 already included in the friction stir joining device M is used to place the rivet 40. This eliminates the necessity of preparing a special device for the placing of the rivet 40. Conclusively, the end joint 13A and the intermediate joint 13B can be formed by using the same (common) friction stir joining device M, and the efficiency of manufacturing the joined assembly 1 can be improved.

Modifications

Although the rotary tool 101 is plunged into the overlapping parts 15 and 16 each including the first member 11 and the second member 12 (flange 32) from the second member 12 when forming the end joint 13A and the intermediate joint 13B respectively in the embodiment, the rotary tool 101 may be plunged into the overlapping parts from the first member 11.

Although the first member 11 and the second member 12 are joined to each other in a state where the members overlap in contact with each other, one or more members may additionally overlap with the first member 11 and the second member 12 and all the members may be joined together in the overlapping state. Specifically, a joined assembly in the disclosure is only required to include at least two members joined to each other by joints including a pair of end joints and an intermediate joint, that is, the joined assembly may include three or more members joined to one another by joints.

Although each of the first member 11 and the second member 12 is formed of a thermoplastic composite including a base material made of thermoplastic resin and many reinforcing members impregnating the base material in the embodiment, the material of the first member 11 may differ from the material of the second member 12. For instance, one of the first member 11 and the second member 12 may be formed of a member made of thermoplastic resin, and the other may be formed of a member made of fiber-reinforced composite. Alternatively, one of the first member 11 and the second member 12 may be formed of a member made of metal, and the other may be formed of a member made of different metal or thermoplastic resin.

Although the three intermediate joints 13B are provided between the pair of end joints 13A in the embodiment, the number of intermediate joints 13B is appropriately changeable in accordance with a length of the flange 32. For instance, the number of intermediate joints 13B may be one, two, or three or more.

Figure 10:
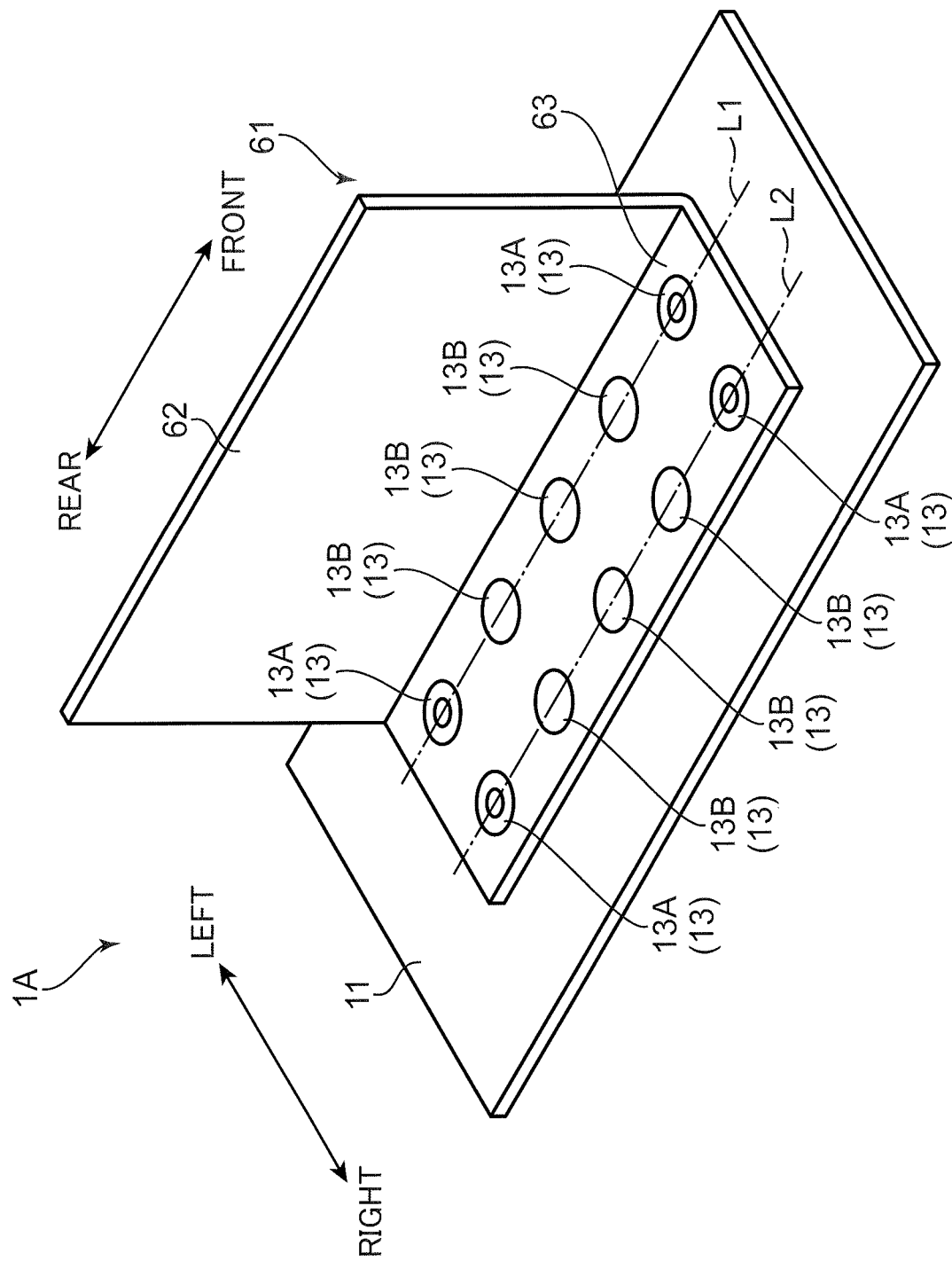
FIG. 10 is a perspective view showing a first modification of the embodiment.

Although the first member 11 and the flange 32 of the second member are joined to each other by the joints 13 aligning in a single row in the front-rear direction, the members may be joined to each other by joints aligning in a plurality of rows. This example is illustrated in FIG. 10. A joined assembly IA illustrated in the drawing includes a first member 11 like the first member in the embodiment, and a second member 61 having a flange 63 with a relatively large width and a main body 62. The flange 63 is joined to the first member 11 by joints 13 aligning in two rows in the front-rear direction. As illustrated in FIG. 10, a row of joints 13 aligning along a line L1 is defined as a first row, and a row of joints 13 aligning along a line L2 extending in parallel to the line L1 is defined as a second row. In this case, the joints in each of the first row and the second row include a pair of front and rear end joints 13A, and a plurality of, specifically, three intermediate joints 13B located between the two end joints. Each end joint 13A includes a rivet 40 and a friction-stirred part 50 (FIG. 2), and each intermediate joint 13B includes only a friction-stirred part 51 (FIG. 3). However, both the first and second rows are not necessarily provided with a mixed configuration of the two kinds of joints, i.e., a mixed configuration of the end joint 13A including the rivet 40 and the intermediate joint 13B excluding a rivet 40, and at least one of the rows may be provided with the mixed configuration. For instance, when only one of the first and second rows is provided with the mixed configuration, all the joints 13 in the other row may have a configuration similar to the configuration of the intermediate joint 13B excluding the rivet 40. This is applicable to a configuration including joints in three or more rows.

Figure 11:
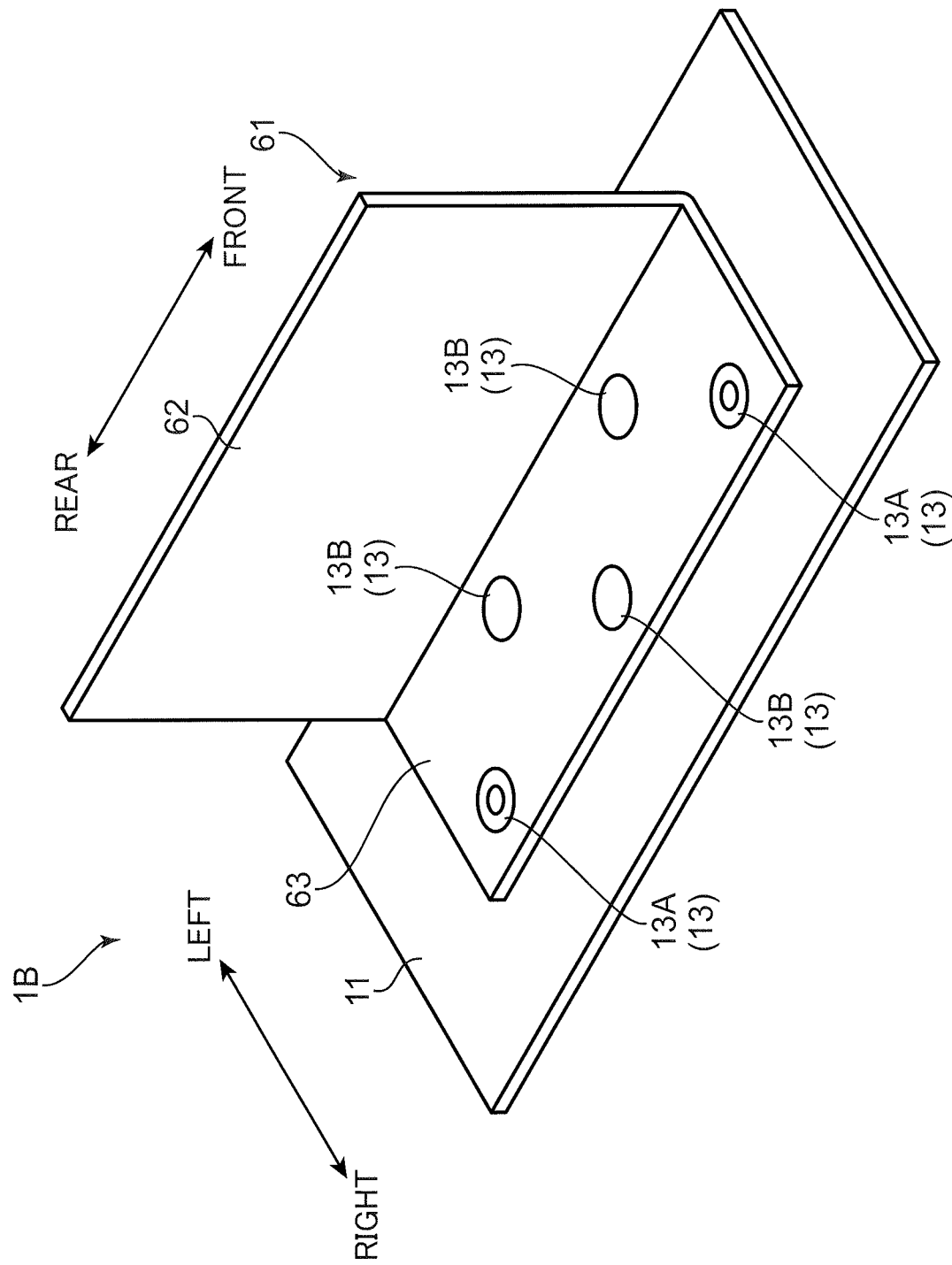
FIG. 11 is a perspective view showing a second modification of the embodiment.

Although the joints 13 align in the rows in the flange 63 having the relatively large width in the joined assembly IA in FIG. 10, the joints may be arranged in a staggered manner like joints 13 in a joined assembly 1B illustrated in FIG. 11 instead. In this case, a frontmost or rearmost joint 13 in the flange 63 may be defined as an end joint 13A including a rivet 40 and a friction-stirred part 50, and each of the remaining joints 13 is defined as an intermediate joint 13B including a friction-stirred part 51.

Although the embodiment exemplifies an application of the disclosure to the joined assembly 1 in which the first member 11 having a planar shape and the second member 12 having a cross-sectionally L-shape are joined to each other, this disclosure is widely applicable to a joined assembly including two or more members joined together, and thus the disclosure is not limited to the example of the embodiment.

Figure 12:
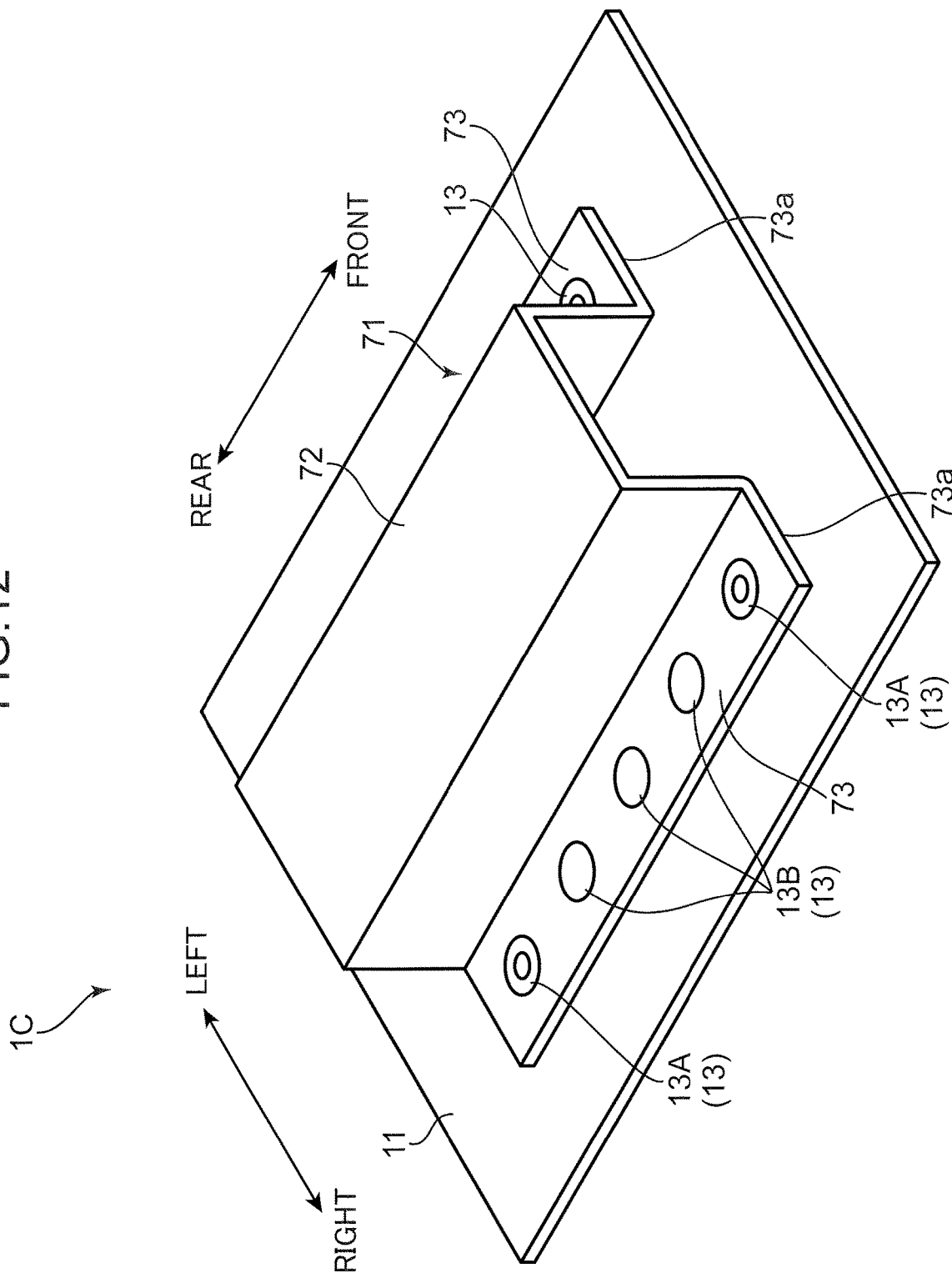
FIG. 12 is a perspective view showing a third modification of the embodiment.

For instance, this disclosure is applicable to a joined assembly 1C illustrated in FIG. 12. The joined assembly 1C in FIG. 12 includes a first member 11 having a planar shape like the first member in the embodiment, and a second member 71 having a cross-sectionally hat-shape. The second member 71 is a frame member that has: a main body 72 having a cross-sectionally inverted U-shape and extending in a front-rear direction, and a pair of flanges 73 respectively extending rightward and leftward from the opposite side sections of the main body 72. The flanges 73 respectively have contact surfaces 73a spaced away from each other and facing the first member 11. Each flange 73 is joined to the first member 11 by joints 13 aligning in the front-rear direction. In the joined assembly 1C, at least one of the flanges 73, i.e., the right flange 3 in the case of FIG. 12, is provided with the joining configuration like the configuration in the embodiment. Specifically, the at least one flange 73 is provided with a pair of front and rear end joints 13A, and a plurality of, specifically, three intermediate joints 13B between the two end joints. Each end joint 13A includes a rivet 40 and a friction-stirred part 50 (FIG. 2), and each intermediate joint 13B includes only a friction-stirred part 51 (FIG. 3). The joining configuration of the other flange 73, i.e., the left flange 73 in FIG. 12, is not particularly limited, but may be a mixed configuration of the end joint 13A and the intermediate joint 13B in the same manner as the one flange 73.

In another modification, this disclosure is applicable to a joined assembly including a frame member having a cross-sectionally Z-shape and joined to a first member having a planar shape. In this manner, this disclosure is preferably applicable to a joined assembly including a member (first member) having a planar shape and a frame member (second member) having a non-planar shape and joined to the first member.

Figure 13:
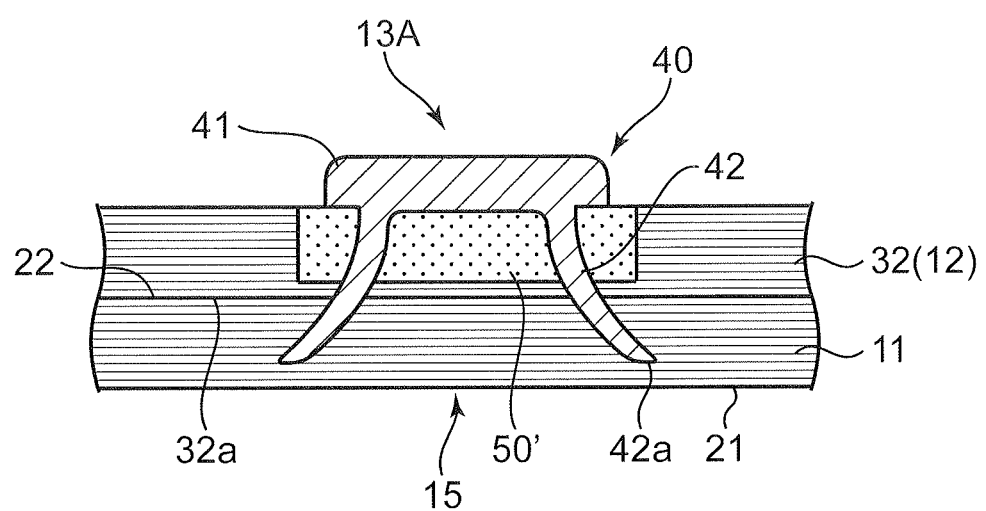
FIG. 13 is a cross-sectional view showing a fourth modification of the embodiment.

Although the end joint 13A is formed to include the friction-stirred part 50 that passes through the second member 12 or the flange 32 in the thickness direction thereof and reaches a certain midway position in the thickness direction of the first member 11, the depth of the friction-stirred part 50 is variously changeable. For instance, the end joint 13A may be formed to include a friction-stirred part that passes through the second member 12 by just the thickness thereof without reaching the first member 11. Further, as illustrated in FIG. 13, an end joint 13A may be formed to include a friction-stirred part 50' not passing through a second member 12, that is, formed to include a friction-stirred part 50' reaching a certain midway position in a thickness direction of the second member 12.

Although the frontmost or rearmost joint 13 in the flange 32 is defined as the end joint 13A including the rivet 40 and the friction-stirred part 50, and each of the remaining joints is defined as the intermediate joint 13B including only the friction-stirred part 51 and excluding a rivet 40, the end joint 13A may include at least a rivet, and the intermediate joint 13B may include at least a friction-stirred part. For instance, the end joint may be defined to include only a rivet, that is, the end joint may exclude the friction-stirred part. The intermediate joint is also variously changeable as long as the intermediate joint has a lower joining strength than the end joint and has a friction-stirred part.

CONCLUSION

The embodiment and the modifications described above cover the disclosure to be described below.

A joined assembly according to one aspect of the present disclosure includes: a first member; a second member which has a facing part facing the first member in a thickness direction thereof; and joints lying along the facing part to join the first member and the second member. The joints include: a pair of end joints respectively located at the opposite end portions of the facing part; and an intermediate joint located between the end joints and having a lower joining strength than the end joints. The end joint includes a fastening member mechanically joining the first member and the second member. The intermediate joint includes a friction-stirred part joining the first member and the second member to each other by friction stir.

Such a friction-stirred part is a weld resulting from a material softened by friction stir and fused. Thus, the joining strength (withstand load) of the friction-stirred part is likely to be lower than the joining strength in the joining adopting the fastening member being a mechanical joining way. This means that the end joint including the fastening member can have a sufficiently higher joining strength than the intermediate joint including the friction-stirred part. Besides, the end joint having the high joining strength is given to an end portion of the facing part where a high stress force is likely to occur against an external force, such as a bending or shearing force, applied thereto. This can effectively suppress eventual breakage of the end joint attributed to the external force, and further satisfactorily ensure the joining strength of the joined assembly as a whole.

By contrast, the intermediate joint located between the two end joints may include the friction-stirred part and exclude a fastening member, and thus, the intermediate joint can exclude the fastening member serving as an auxiliary member. This reduces the required number of fastening members, resulting in achieving suppression of a manufacturing cost of the joined assembly and workloads required for the manufacturing. This is further advantageous to suppression of an increase in the weight of the joined assembly due to additional fastening members.

Preferably, the end joint includes, in addition to the fastening member, a friction-stirred part joining the first member and the second member by friction stir, and the intermediate joint includes the friction-stirred part and excludes a fastening member.

This configuration allows the end joint including the fastening member and the friction-stirred part in combination to have a joining strength sufficiently higher than the joining strength of the intermediate joint including only the friction-stirred part.

For instance, the friction-stirred part is allowed to pass through the second member in a thickness direction and reach a certain midway position in the thickness direction of the first member.

This configuration enables the friction-stirred part to reliably join the first member and the second member.

The second member may include two or more of the facing parts spaced away from each other. In this case, at least one of the facing parts may be provided with the pair of end joints and the intermediate joint.

The material of each of the first member and the second member is not particularly limited. However, as a preferable example, each of the first member and the second member is made of thermoplastic resin, or thermoplastic composite containing thermoplastic resin impregnated with reinforcing fibers.

This configuration enables the members made of thermoplastic resin or thermoplastic composite to be joined to each other at a desired strength, and achieves suppression of a manufacturing cost thereof.

The shape and the usage of each of the first member and the second member are not particularly limited. However, as a preferable example, the first member is a member having a planar shape to form an outer panel of a structure, and the second member is a frame member having a non-planar shape and extending in a specific direction along a back surface of the first member.

This configuration enables the plate member and the frame member to be joined to each other at a desired strength, and achieves suppression of the manufacturing cost.

A joining method according to another aspect of the disclosure is a method for joining a first member and a second member which has a facing part facing the first member in a thickness direction thereof. The method includes: an end joining step of forming a pair of end joints respectively at the opposite end portions of the facing part; and an intermediate joining step of forming, between the end joints, an intermediate part having a lower joining strength than the end joints. In the end joining step, the end joint is formed to include a fastening member mechanically joining the first member and the second member, and a friction-stirred part joining the first member and the second member by friction stir. In the intermediate joining step, the intermediate joint is formed to include a friction-stirred part joining the first member and the second member by friction stir and excluding a fastening member. The end joining step and the intermediate joining step are executed by a common friction stir joining device.

The disclosure eliminates the necessity of preparing a special device for the placing of the fastening member. Conclusively, the end joint and the intermediate joint can be formed by using the same friction stir joining device, and the efficiency of manufacturing the joined assembly can be improved.

The invention claimed is:

1. A joined assembly, comprising:
a first member;
a second member which has a facing part facing the first member in a thickness direction thereof; and
joints lying along the facing part to join the first member and the second member to each other, wherein
the joints include:
a pair of end joints respectively located at the opposite end portions of the facing part; and
an intermediate joint located between the end joints and having a lower joining strength than the end joints,
the end joints each include a combination of:
a fastening member mechanically joining the first member and the second member, and
a friction-stirred part joining the first member and the second member by friction stir, and
the intermediate joint includes a friction-stirred part joining the first member and the second member by friction stir, and the intermediate joint excludes a fastening member.

2. The joined assembly according to claim 1, wherein the friction-stirred part of one or more of the end joints and the intermediate joint passes through the second member in a thickness direction and reaches a certain midway position in the thickness direction of the first member.

3. The joined assembly according to claim 1, wherein the second member includes two or more of the facing parts spaced away from each other, and
at least one of the facing parts is provided with the pair of end joints and the intermediate joint.

4. The joined assembly according to claim 1, wherein each of the first member and the second member is made of thermoplastic resin, or thermoplastic composite containing thermoplastic resin impregnated with reinforcing fibers.

5. The joined assembly according to claim 1, wherein the first member is a member having a planar shape to form an outer panel of a structure, and
the second member is a frame member having a non-planar shape and extending in a specific direction along a back surface of the first member.

6. A method for joining a first member and a second member which has a facing part facing the first member in a thickness direction thereof, the method comprising:
an end joining step of forming a pair of end joints respectively at the opposite end portions of the facing part; and
an intermediate joining step of forming, between the end joints, an intermediate joint having a lower joining strength than the end joints, wherein,
in the end joining step, the end joints are each formed to include a fastening member mechanically joining the first member and the second member, and a friction-stirred part joining the first member and the second member by friction stir,
in the intermediate joining step, the intermediate joint is formed to include a friction-stirred part joining the first member and the second member by friction stir and excluding a fastening member, and
the end joining step and the intermediate joining step are executed by a common friction stir joining device.

7. The joined assembly according to claim 1, wherein the friction-stirred part of each of the end joints is formed by friction-stirring an overlapping part of the first member and the second member by a rotary tool to make a plastic flow of materials of the first member and the second member.

8. The joined assembly according to claim 7, wherein the fastening member passes through the friction-stirred part of each of the end joints and extends beyond the friction-stirred part into the second member.

* * * * *